United States Patent [19]
Mostert et al.

[11] Patent Number: 5,224,986
[45] Date of Patent: Jul. 6, 1993

[54] PROCSS FOR THE RECOVERY OF TITANIUM VALUES

[76] Inventors: Gerhard J. Mostert, 585 Breyten Street, Faerie Glen, Pretoria, Transvaal Province; Bodo R. Rohrmann, 11 Karen Street, Del Judor Extension 1, Witbank, Transvaal Province; Roger J. Wedlake, 23 Ely Avenue, Mulbarton, Johannesburg, Transvaal Province; Rodney C. Baxter, 6 Bedford Garden Villas, Bedford Gardens, Transvaal Province, all of South Africa

[21] Appl. No.: 735,369
[22] Filed: Jul. 24, 1991

[30] Foreign Application Priority Data

Jul. 25, 1990 [ZA] South Africa ............ 90/5857
Feb. 15, 1991 [ZA] South Africa ............ 91/1146

[51] Int. Cl.$^5$ ............................................. C22B 34/00
[52] U.S. Cl. ................................. 75/586; 75/677; 75/622; 423/492
[58] Field of Search ............... 75/617, 622, 586; 423/492

[56] References Cited

U.S. PATENT DOCUMENTS

| | | | |
|---|---|---|---|
| 3,775,096 | 11/1973 | Guidotti | 75/622 |
| 3,825,415 | 7/1974 | Johnston | 75/617 |
| 3,848,051 | 11/1974 | Mas | 423/492 |
| 4,036,637 | 7/1977 | Anderson | 75/622 |

FOREIGN PATENT DOCUMENTS 275580 3/1928 United Kingdom .
795386 5/1958 United Kingdom .

OTHER PUBLICATIONS

UK Patent Search dated Sep. 13, 1992 for Application No. 9116070.5.
UK Patent Search dated Feb. 7, 1992 for Application No. 9116070.5.

*Primary Examiner*—Peter D. Rosenberg
*Attorney, Agent, or Firm*—Arnold, White & Durkee

[57] ABSTRACT

This invention provides a process for the recovery of titanium values from a complex matrix comprising titanium nitride. The process comprises chlorinating the titanium nitride in the matrix to obtain a reaction product containing titanium chloride, and separating the titanium chloride from the reaction product. The invention also provides for the production of said complex matrix containing titanium nitride by nitriding titanium values in complex titanium-containing starting materials such as complex metallurgical titaniferous slags and ilmenite, perovskite, armalcolite and fassaite.

28 Claims, 4 Drawing Sheets

PROCSS FOR THE RECOVERY OF TITANIUM VALUES

This invention relates to a process for the recovery of titanium values, as titanium chloride or, optionally, titanium oxide from a complex matrix comprising titanium nitride as a constituent thereof. More particularly, it relates to a process suitable for the recovery of titanium values as titanium chloride from a said matrix which is obtained by nitriding a complex mineral or metallurgical starting material such as a titaniferous ore or titaniferous slag containing titanium oxide in addition to other metal oxides, especially low-grade titaniferous slags containing 30–80% by mass, or less, titanium expressed as $TiO_2$, and titaniferous ores which are mixed metal oxides or titanates.

According to the invention there is provided a process for the recovery of titanium values from a complex matrix comprising titanium nitride as a constituent thereof, the process comprising the steps of:

chlorinating the titanium nitride in the matrix to obtain a reaction product containing titanium chloride; and separating the titanium chloride from the reaction product.

As described in more detail hereunder, the chlorinating of the titanium nitride may be by contacting a chlorinating gas with the matrix at a temperature of 200°–500° C., to obtain the titanium chloride as $TiCl_4$; and, as indicated above, the process is suitable for the recovery of titanium values from matrixes which are obtained by nitriding complex mineral or metallurgical starting materials. Accordingly, the process may include the step of obtaining the matrix containing titanium nitride by nitriding titanium values in a complex titanium-containing starting material.

Although the process has substantial value for mineral or metallurgical starting materials which can have high titanium values of e.g. above 80% by mass expressed as $TiO_2$, it is particularly useful for metallurgical starting materials such as titaniferous ores or slags which are more or less complex and can have relatively low titanium values of less than 80% by mass, and as low as 30% or even less, expressed as $TiO_2$. Thus, the starting material may be a complex metallurgical titaniferous slag containing at most 80% by mass titanium values; or, instead, the starting material may be selected from the group of ores consisting of rutile, ilmenite, perovskite, armalcolite, fassaite and mixtures thereof.

As the nitriding step is conveniently carried out by passing nitrogen gas at an elevated temperature through or over the starting material in particulate form, the process may involve nitriding a starting material having a maximum particle size which is as small as feasible or practicable, e.g. 10–2000 μm with an average particle size of at most 600 μm, with a maximum particle size and average particle size preferably in the range 50–100 μm. The process may thus include the step, prior to the nitriding of the titanium values, of size reduction of the starting material to a maximum particle size of at most 2000 μm and an average particle size of at most 600 μm. Size reduction will typically be by crushing and milling, and the final particle size and particle size distribution chosen will usually depend on economic considerations, milling costs being traded off against increased surface area made available for a rapid and complete nitriding reaction.

As indicated above, the nitriding will typically be by passing nitrogen gas through or over a particulate starting material at an elevated temperature, optionally at atmospheric or elevated pressure, and this may be effected with an excess of nitrogen gas in a reducing environment, provided e.g. by carbon admixed in particulate form in suitable proportions in the starting material. In other words, the nitriding of the titanium values may be by contacting a stoichiometric excess of nitrogen gas with the starting material at an elevated temperature and in a reducing environment. Surprisingly, the use of a stoichiometric excess of nitrogen can purge carbon dioxide from the reaction zone and can suppress the formation of titanium carbide, which is undesirable. Preferably the gas used for the nitriding comprises at least 25% by volume nitrogen although, naturally, the higher the nitrogen content (up to 100%) the better the nitriding achieved. The nitriding step may be carried out in a suitable metallurgical reactor, such as a rotary or shaft kiln, fluidized bed reactor or the like with a solid starting material. Instead, the starting material may naturally be in a liquid state, the nitriding taking place in a ladle or electric furnace with the nitrogen gas being injected by means of a suitable lance.

Preferably the nitrogen is fed through or over the starting material, after intimate admixing thereof with the carbon to provide a starting mixture, at a temperature of 1000°–1800° C., preferably 1100°–1600° C. and more preferably 1200°–1350° C. The time required for the nitriding will be inversely related to the temperature and, once again, the precise temperature employed will involve economic considerations, the advantage of employing lower temperatures being traded off against longer nitriding times. Thus, in particular, the contacting of the nitrogen gas with the starting material may take place at a temperature of 1000°–1800° C., in the presence of carbon which provides the reducing environment, sufficient carbon being present to consume any oxygen present in the environment and to provide a stoichiometric excess over that required to reduce the titanium values (as $TiO_2$) in the starting material, to titanium.

Naturally, the rate at which nitrogen is fed to the starting mixture should be sufficient to take the nitriding to an acceptable degree of completion within an acceptable time. Mean residence times may be employed of ½–5 hours or less, e.g. 1–3 hrs. Once again, it is expected that there will be an economic trade-off between a high rate of nitrogen supply, and the cost of providing the nitrogen and losses of heat and unreacted nitrogen passing through the starting mixture; and it should be noted that, with good gas contact, e.g. with finely divided starting material in a fluidized bed or rotary kiln, lower residence time of e.g. 1–2 hours are expected to be sufficient.

The nitriding reaction is strongly endothermic. Heat must thus be supplied to the reaction zone to maintain the reaction temperature. This can be done via the reactor, e.g. by using an electrically heated furnace or plasma arc heating, and/or it can be done by preheating the nitrogen. While the nitrogen can be substantially pure and indirectly heated via a suitable heat exchanger, it is expected that any heating thereof will be by means of a burner, air being used to burn a typically carbonaceous fuel such as producer gas, coal tar fuel, heavy oil or coal fines, to achieve the required temperature, so that the nitrogen is fed to the starting mixture as a mixture of nitrogen with carbon monoxide and water vapour, in the substantial absence of oxygen. In other words, a carbonaceous fuel may be burnt in air to provide a combustion gas which is contacted with the starting material to provide said elevated temperature, and to provide the carbon required for the reducing environment in the form of carbon monoxide. Instead, however, the process may include the step of admixing a carbonaceous material in finely divided particulate form with the starting material to provide the reducing environment.

According to another approach, it may be feasible, instead or in addition to other methods of supplying heat, for the nitrogen feed to contain oxygen, air e.g. being fed to the starting mixture and the starting mixture containing sufficient additional carbon to remove the oxygen from the air by combustion. This can aid in maintaining the heat supply to the nitriding reaction.

When the nitrogen is fed in the substantial absence of oxygen gas, the proportion of carbon admixed with the starting material to form the starting mixture may be 100–300% of the stoichiometric value, typically 150–200% of the stoichiometric value. By 'the stoichiometric value' is meant the amount of carbon required to reduce the titanium values (expressed as $TiO_2$) in the starting material to TiN, depending on the reaction conditions existing. When air is fed as described above, sufficient additional carbon should be provided to ensure removal of the oxygen from the air, e.g. a slight stoichiometric excess for this purpose, in addition to the excess required to react with bound oxygen in the starting material during the reduction of oxides therein necessary to nitride the titanium values therein. This approach will naturally require removal of at least some of such excess carbon after the nitriding, if the chlorinating is to take place in a less reducing environment than the nitriding environment, as described hereunder.

The carbon admixed with the starting material may in principle be in the form of coal, anthracite, coke, industrial char, charcoal, graphite or the like, amorphous forms of carbon such as lamp black or soot having been found to lead to acceptable results. The carbon, similarly, should preferably be in finely divided form for intimate admixing with the starting material, the carbon having a particle size similar to that of the starting material, e.g. 50–100 μm or less. These small particle sizes facilitate separating of carbon from the nitrided material after the nitriding in a fluidized bed, by fluidizing at a high rate to cause carry-over or elution of carbon particles.

Preferably the chlorinating step takes place in an environment which is less reducing than the environment in which the nitriding takes place.

Encouraging the chlorinating to take place in a less reducing environment than that in which the nitriding takes place can involve, in principle, admixing carbon with the starting material to provide the reducing environment in which the nitriding takes place, in a quantity and/or at a rate such that, after the nitriding step, the proportion of carbon in the nitrided matrix is less than the proportion of carbon mixed with the starting material at the start of the nitriding, and is preferably as low as possible or practicable, substantially all the carbon being oxidized to carbon dioxide during the nitriding, so that the environment in which the chlorinating takes place is substantially non-reducing.

If it is desirable to have relatively high proportions of carbon in the starting material to promote rapid and/or complete nitriding of the titanium values, it may not be possible to ensure the substantial absence of carbon when the nitriding is complete. In this case the process may involve, instead, separation of carbon from the titanium nitride-containing matrix after the nitriding step and before the chlorinating step. This may be effected by a physical separation step, such as blowing off the carbon during fluidization of the titanium nitride-containing matrix with a gas, floating off the carbon during fluidization of the titanium nitride-containing matrix with a liquid, flocculation of the carbon with the titanium nitride-containing matrix suspended in a liquid, followed by separation of the flocs therefrom, e.g. by flotation, or the like. In other words, the process preferably includes the step, after nitriding and before the chlorinating, of separating carbon from the matrix. Separating the carbon to lessen the reducing nature of the environment can be by gas blowing in a fluidized bed used for the nitriding.

Surprisingly, said lessening of the reducing nature of the environment, before the chlorinating step, can suppress or preferably eliminate the formation, during the chlorinating step, of chlorides of other metal oxide values in the starting material, thereby lessening chlorine, consumption and lessening the production of unwanted chlorides. The Applicant believes that this feature of the process can be advantageous in confining the formation of gaseous metal chlorides to those of titanium, iron and vanadium and limiting the formation of solid chlorides to those of manganese, magnesium and calcium. Chlorides of metals other than titanium are undesirable impurities in the titanium chloride product and can aggravate the possibility of clogging of reactors such as fluidized beds, by melting at the temperatures in question.

As manganese is often present in acceptably small proportions (<1% by mass) in the starting material, and as its chloride has respective melting and boiling points of 650° C. and 1290° C., it is not regarded as a particularly undesirable impurity of the $TiCl_4$ product as it can easily be separated therefrom. Similar considerations apply to calcium and magnesium which are present in higher quantities but have higher melting points and boiling points. Furthermore, since chlorination of magnesium and calcium is kinetically slower than titanium, the production of gaseous $TiCl_4$ takes place to a much larger extent, resulting in the formation of relatively small amounts of the solid chlorides of magnesium and calcium. This favours the production of $TiCl_4$ at the expense of chlorides of magnesium and calcium, so that these impurities need be present in no more than acceptable proportions.

The chlorination of the titanium nitride, obtained e.g. from a nitrided starting material, may be by passing a chlorinating gas such as HCl, $CCl_4$, $SCl_2$ or preferably $Cl_2$ over or through the nitrided matrix, at a suitable temperature, which for $Cl_2$ is 200°–500° C., preferably 350°–450° C. In other words, the chlorinating of the titanium nitride may be by contacting a chlorinating gas selected from the group consisting of $Cl_2$, HCl, $CCl_4$, $SCl_2$ and mixtures thereof, with the matrix at a temperature of 350°–450° C., to obtain the titanium chloride as $TiCl_4$. In this regard the Applicant has surprisingly found that suitable selection of the nitriding temperature (e.g. 1200°–1350° C.) can ensure that the starting material remains in particulate form after the nitriding thereof, of a suitable particle size for the chlorination. No further size reduction thereof is required and it merely requires to be cooled and moved to a suitable reaction vessel, such as a fixed bed, countercurrent cyclone or, conveniently, a fluidized bed. Any metals produced during the nitriding can simply be removed, after said cooling, by magnetic separation and/or by gravimetric separation. Unwanted production of chlorides of the metals can thus be further reduced or preferably eliminated.

The above chlorination temperatures are selected so that the TiN in the nitrided matrix is converted to $TiCl_4$, and at these temperatures the Applicant believes that other major volatile chlorination products which can be produced in any material amounts are transition metal chlorides such as ferric chloride ($FeCl_3$), vanadium chloride ($VCl_4$), vanadium oxychloride ($VOCl_3$) and silicon chloride ($SiCl_4$). Any $FeCl_3$ or vanadium chlorides and/or oxychlorides can easily be condensed, together with the $TiCl_4$, from the gas issuing from the chlorination vessel. Any $FeCl_3$ produced can be condensed at atmospheric pressure at a substantially higher temperature than $TiCl_4$ or $VOCl_3$, and can thus easily be removed, e.g. in a cyclone or the like by separation at 290° C. of solid $FeCl_3$ and $TiCl_4$ gas. In this regard it is to be noted that $FeCl_3$ melts at 306° C. and at 315° C. it decomposes to $FeCl_2$ and $Cl_2$, $FeCl_2$ having a melting point substantially higher than 315° C. and $Cl_2$ being a gas; $TiCl_4$ boils at 136° C.; $VOCl_3$ boils at 126° C.; $SiCl_4$ boils at 58° C. and $VCl_4$ boils at 148° C. The $TiCl_4$ and any $VOCl_3$ or $VCl_4$ are thus subsequently condensible together (to separate them eg from any $SiCl_4$ or the like) and are then separable by distillation in known fashion, after which the $TiCl_4$, which is of substantial purity, can easily be oxidized to $TiO_2$, a valuable pigment, in known fashion.

It should be noted that calcium, magnesium and manganese are present in most oxygen-containing mineral complexes. They can thus be present in most starting materials employed by the present process, particularly metallurgical slags. It is a particular and surprising advantage of the present process that the low temperature chlorination temperatures employed lead to reduced chlorination of these metals. Furthermore, importantly, the chlorides of these metals are solid at 200°-500° C. This is a material advantage compared with chlorination at temperatures which are higher and are sufficient to melt the chlorides of these metals, which melting can lead to clogging up of reactors such as rotary kilns or fluidized beds.

With regard to the chlorination, it should be noted that this is exothermic. If e.g. a fluidized bed reactor is used for the chlorination, heat produced can be removed by the fluidizing gas, most of which will be inert carrier gas, and heat can, if desired, be recovered in known fashion from this gas.

The chlorinating gas may be fed over the nitrided matrix in diluted form, e.g. diluted with an inert gas such as argon or nitrogen. When the chlorinating gas is $Cl_2$, it may be mixed with nitrogen in proportions of at least 10% by volume $Cl_2$, e.g. 20–80% by volume $Cl_2$, and it may be fed at atmospheric or elevated pressure. Accordingly, in a particular embodiment, the chlorinating gas may be $Cl_2$ being diluted with nitrogen to form a mixture comprising 20–80 by volume $Cl_2$. The chlorinating gas may be fed over the nitrided matrix for a mean residence time of 10–120 minutes, sufficient to chlorinate the TiN in the nitrided material to an acceptable degree of completion in an acceptable time, without employing unnecessarily excessive amounts of chlorinating gas, as dictated by economics. As indicated above, lessening the reducing nature of the environment in the chlorinating step compared with the nitriding step, can reduce the proportion of chlorides other than $TiCl_4$ produced, and reaction conditions in the chlorinating step can be selected which lessen the production of such other chlorides bearing in mind the kinetics of the production of such chlorides.

After the condensation of the $TiCl_4$ and any $VOCl_3$, the chlorinating gas and nitrogen remaining therein, may be recycled to the chlorination vessel, chlorinating gas feed or make-up being added thereto.

The Applicant has found, as discussed in more detail hereunder, that titaniferous slag, obtained from Highveld Steel and Vanadium Corporation Limited, Witbank, as well as rutile and ilmenite, can be nitrided in accordance with the process of the present invention. Nitriding such a slag produces a nitrided matrix which, upon X-ray diffraction analysis, shows a well defined TiN crystalline phase, and very few, if any, other well defined crystalline phases of any material significance. No signs of titanium carbide or titanium carbonitride formation have been noted, nor indeed any other metal carbide or carbonitride formation. It thus appears that the remaining constituents of the starting slag form a glassy, non-crystalline matrix phase during the nitriding step and that a high proportion (90% by mass or more) of the titanium values can be converted to the nitride. In the subsequent chlorination, the only chlorides produced to any material extent are $TiCl_4$, $FeCl_3$ and $VOCl_3$, and these can easily be condensed and separated, as described above.

Between the nitriding and the chlorinating steps, or initially, the process may include a magnetic separation of iron from the material being treated, and, to enhance this, the starting material may first be treated with carbon and a suitable flux such as $CaCO_3$, e.g. at 800°–1200° C., to reduce iron oxides to iron. This step can reduce the amount of $FeCl_3$ waste product eventually produced (see e.g. MacMillan et al - 'Proposed Process for Treatment of Low-Grade Titaniferous Ores' U.S. Department of the Interior, Bureau of Mines Report of Investigations 4638, January, 1950).

When the complex titanium oxide-containing starting material is a mixed metal oxide or titanate, e.g. an ore such as ilmenite ($FeOTiO_2$), perovskite ($CaOTiO_2$), fassaite ($Ca(Ti,Mg,Al)(Si,Al)_2O_6$) or possibly armalcolite ($MgO.2TiO_2$), the nitriding step can lead to the production, during the nitriding step, of one or more metals, in metallic form, from metal values other than titanium present in said mixed metal oxide or titanate.

Such metals can be separated from the matrix, before the chlorinating step, by physical methods, e.g. gravimetric or magnetic separation, or by chemical methods such as leaching, e.g. employing hydrochloric acid. Thus, in general, when the matrix comprising the titanium nitride also contains a metal other than titanium, the process may include the step, before the chlorinating, of separating the metal from said matrix.

Whether lessening of the reducing nature of the environment before the chlorinating, or the separation of any metal produced before the chlorinating, or both, are employed, as described above, will depend largely on the nature of the complex titaniferous starting material used, and this can be determined by routine testing. Furthermore, while it is in principle desirable completely to eliminate both the reducing environment and any said metals produced before the chlorination, economic considerations may naturally dictate that these steps are not carried out to completion.

The invention also provides a process for obtaining, from complex titanium-containing starting materials, a matrix comprising titanium nitride as constituent thereof, suitable for use in the recovery of titanium values as described above.

Thus, according to another aspect of the invention there is provided a process for producing a matrix comprising titanium nitride as a constituent thereof and suitable for use in the process for the recovery of titanium values as described above, the process comprising nitriding titanium values in a complex titanium-containing starting material selected from complex metallurgical titaniferous slags, ilmenite, perovskite, armalcolite and mixtures thereof.

The invention also extends to titanium values whenever recovered by the process for the recovery thereof as described above; and the invention extends to matrixes comprising titanium nitride as a constituent thereof, whenever produced by the process for the production thereof as described above.

The invention will now be described by way of example, with reference to the accompanying drawings and Example.

EXAMPLE 1

Titaniferous slaf from Highveld Steel and Vanadium Corporation Limited comprising about 30% by mass titanium values (as $TiO_2$) was milled and crushed to a particle size of less than 1000μ. Carbon, in the form of lamp black having an average particle size of 0,5μ was intimately mixed with the slag, in a proportion of 20% by mass.

A sample of the mixture of slag and lamp black was loaded into an α-alumina crucible and placed in an electrically heated tube furnace. The furnace was repeatedly (4 times) evacuated to a vacuum of about 20 Torr and flushed with high purity (99,9998% by volume) nitrogen. A steady stream of this nitrogen was then fed through the furnace at a rate of 40 ml/min.

The furnace was then slowly heated over a period of 5 hrs from ambient to 1550° C. at a substantially constant heating rate of 5° C./minute and kept at 1550° C. for 10 hrs to nitride the starting mixture and obtain a nitrided matrix.

The furnace was then allowed to cool naturally to ambient and the nitrided matrix was subjected to X-ray diffraction, together with a sample of the starting (un-nitrided) mixture.

Figure 1:
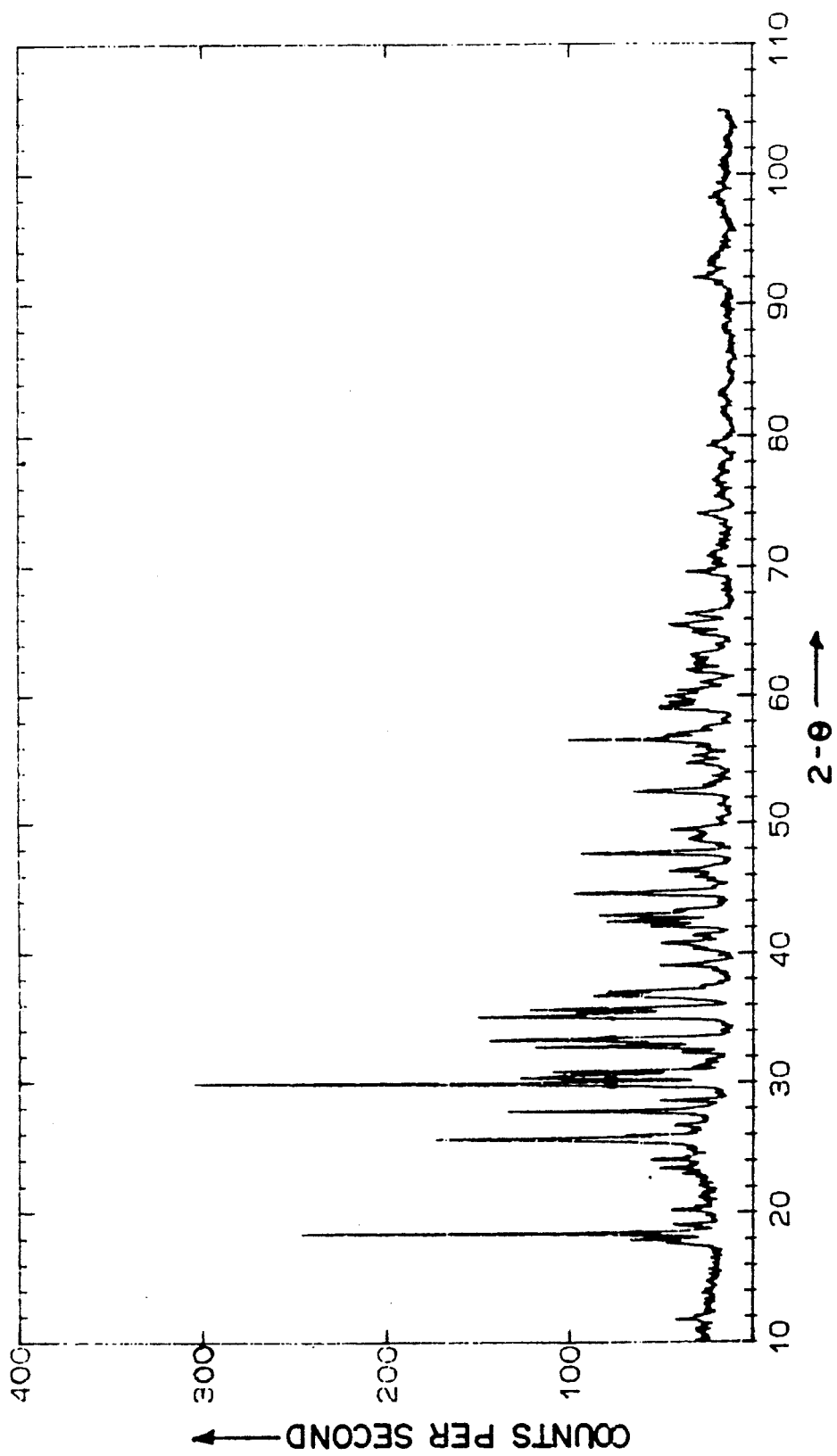
FIG. 1 shows an X-ray diffraction pattern trace of titaniferous slag obtained from Highveld Steel and Vanadium Corporation limited, for the °2θ range of 10°-110° using CuK$_\alpha$ radiation.
Figure 2:
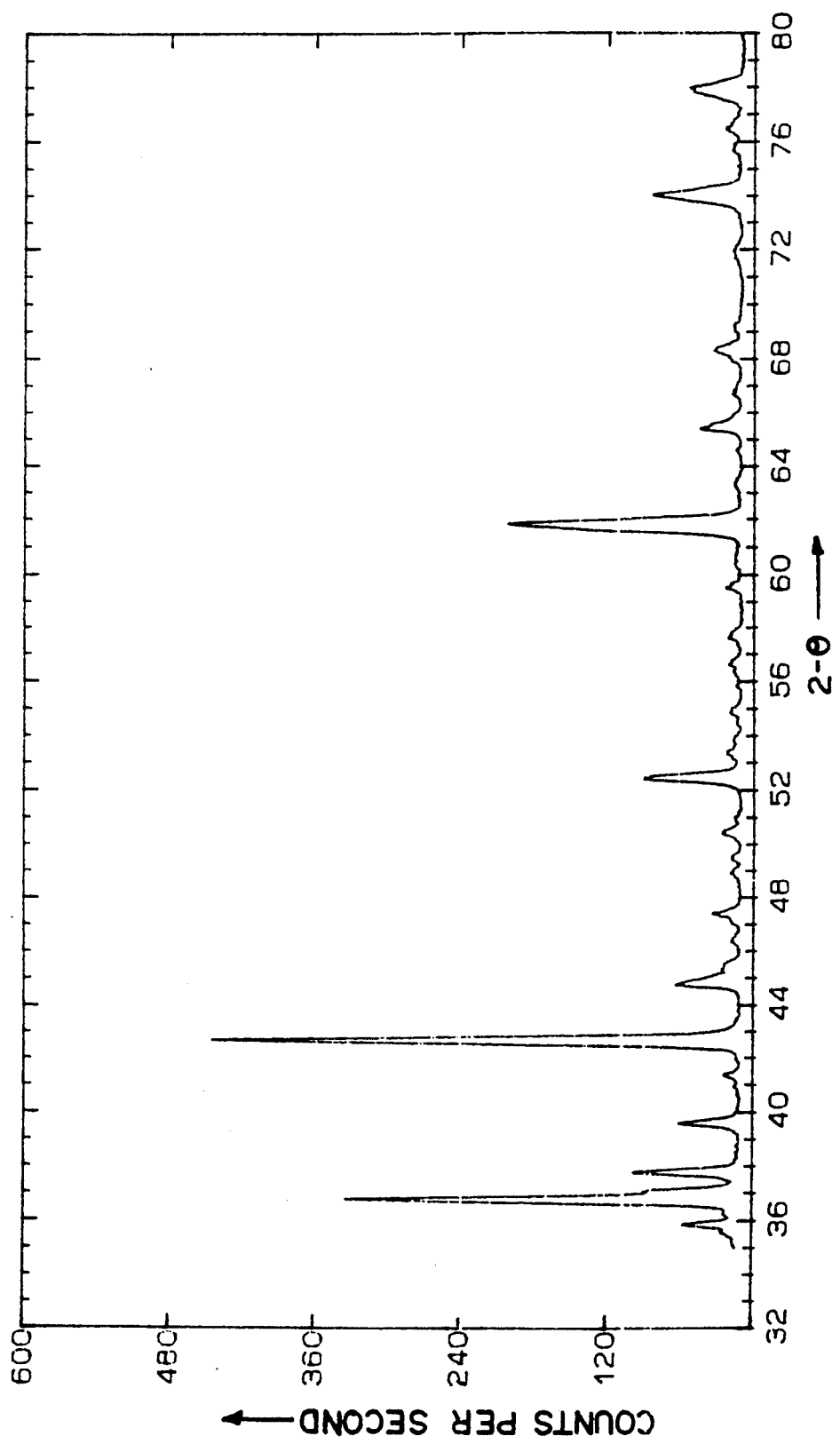
FIG. 2 shows a similar trace for the °2θ range of 32°-80° for the slag whose trace is shown in FIG. 1, but after the slag has been nitrided in accordance with the following Example 1.

The X-ray diffraction trace of the starting mixture is shown in FIG. 1, and that of the nitrided matrix in FIG. 2. FIG. 1 shows that the starting mixture has a relatively high degree of crystallinity, whereas FIG. 2 shows that the nitrided matrix is comparatively amorphous, except for a substantial proportion of TiN, indicated by a number of distinct TiN peaks in FIG. 2.

Before the nitriding the starting mixture was black and after the nitriding a number of lighter-coloured specks were visible to the naked eye in the matrix.

Figure 3:
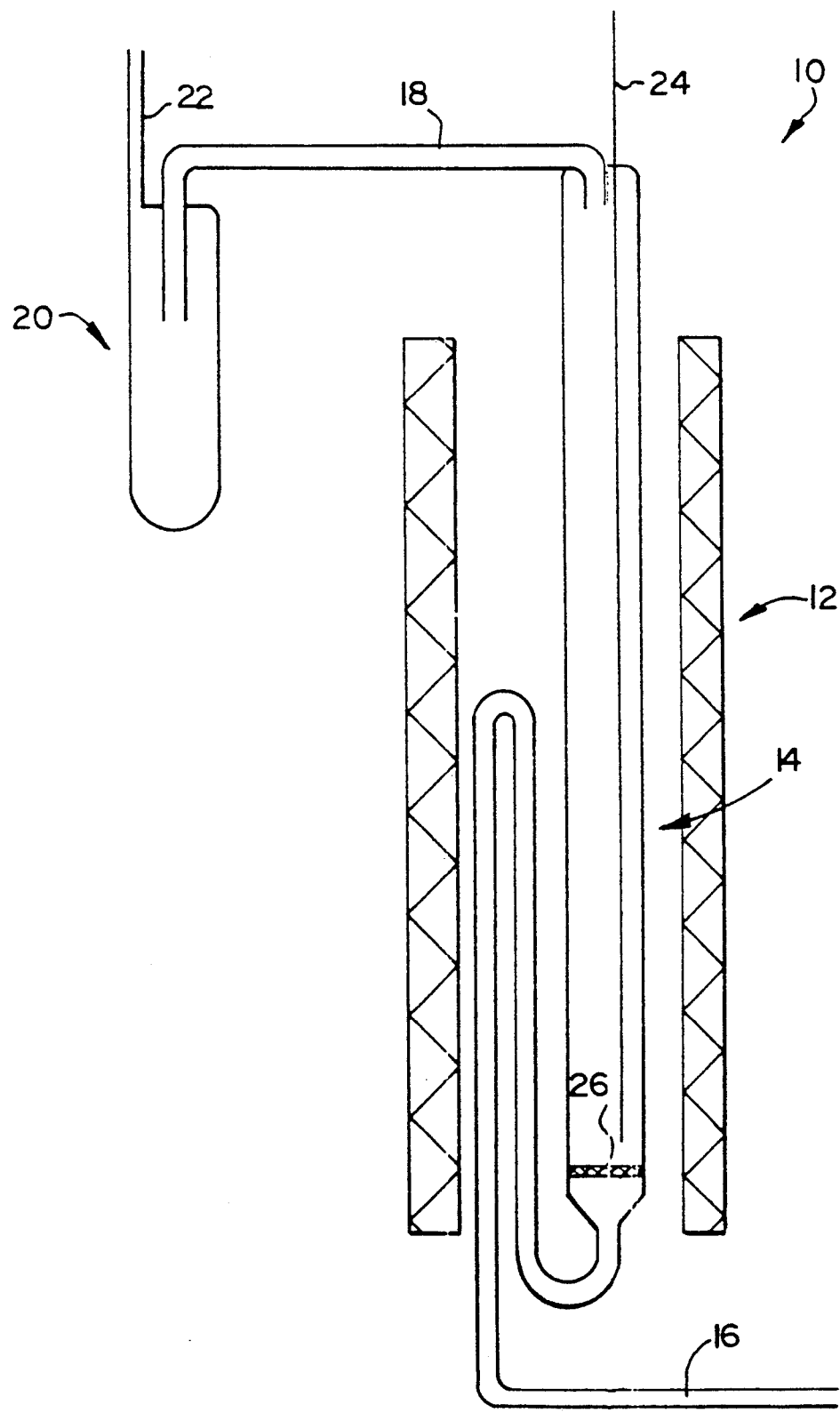
FIG. 3 shows a schematic cross-section of the apparatus used for chlorinating the nitrided slag in accordance with Example 1.

Referring now to FIG. 3, the nitrided matrix was chlorinated in apparatus generally designated by reference numeral 10. The apparatus 10 comprises a tubular electrical heater 12, within which is located a tubular glass reaction vessel 14 having a glass inlet tube 16 and a glass outlet tube 18 leading to a glass collection flask 20. The flask 20 has a glass gas outlet tube 22 and the vessel 14 is provided with a thermocouple 24 and a porous sintered glass disc 26.

In use of the apparatus 10, 10 g of the nitrided matrix was placed in the vessel 14 on the disc 26 and chlorinating gas in the form of $Cl_2$ was fed via the tube 16 thereto at a rate of 60 ml/min, while the temperature of the chlorinator was increased by means of the heater 12 stepwise from ambient by the steps of about 50° C. up to a temperature of 350° C., at which stage the $Cl_2$ started to react with the matrix. The reaction was discontinued after 1,5 hours, when it appeared to be complete.

About 6 g of reaction product was obtained in the product collection flask 20 via the vessel 14, in the form of a yellow-brown liquid, together with a small amount of red solid material. The liquid was decanted and subjected to elemental analysis, the analysis being set forth in the following table, Table 1:

TABLE 1

| Element | % by mass |
|---------|-----------|
| Cl | 75,8 |
| Ti | 20,9 ± 0,3 |
| V | 0,93 ± 0,03 |
| Si | 0,18 ± 0,06 |
| Al | 0,01 |
| Fe | <0,01 |
| Mg | <0,005 |
| Cr | not detected |
| Ca | not detected |

From the analysis set forth in Table 1, and ignoring the negligible amounts of Al, Fe, Mg, Cr and Ca detected, it appears that the liquid comprised a mixture of $TiCl_4$, $VCl_4$ and/or $VOCl_3$ and $SiCl_4$, with some $Cl_2$ dissolved therein, and having an analysis as set forth in the following table, Table 2:

TABLE 2

| Compound | % by mass |
|----------|-----------|
| $TiCl_4$ | 82,7 |
| $VCl_4$ and/or $VOCl_3$ | 3,5 |
| $SiCl_4$ | 1,1 |
| $Cl_2$ | 12,7 (balance) |

To test the feasibility of the step of lessening the reducing nature of the environment in which the chlorination took place, pure $V_2O_5$ was chlorinated, in the presence of carbon in the tube 18 according to the reactions

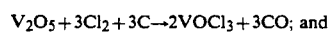

$V_2O_5 + 3Cl_2 + 3C \rightarrow 2VOCl_3 + 3CO$; and

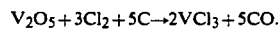

$V_2O_5 + 3Cl_2 + 5C \rightarrow 2VCl_3 + 5CO$.

The chlorination was carried out at 350° C. in each case over a period of 1 hour. In the first case a bright yellow VOCl₃ product was formed; and in the second case a dark blue VCl₃ product.

The tests were repeated in the absence of carbon with no visible reaction, after which the temperature was increased by increments of 50° C. and maintained at each increased temperature for a period of 30 minutes, up to a maximum temperature of 450° C. No visible reaction occurred whatsoever, indicating that the absence of the reducing environment provided by the carbon, at least as far as $V_2O_5$ is concerned, suppressed the side reactions leading to the production of $VOCl_3$ and $VCl_3$.

EXAMPLE 2

Complex titanium-containing starting materials, respectively the slag of Example 1 and ilmenite and carbon reductants in the form of coal and char, were crushed and milled to a maximum particle size of less than 53 μm. The starting materials were then intimately mixed with the carbon reductants in the required proportions to provide starting mixtures.

Samples of various starting mixtures were respectively loaded into two graphite boats in an electrically heated sealed horizontal tube furnace, the boats together containing five samples of 40 g each.

The furnace was heated at a rate of 255° C./hr up to its operating temperature of 1300° C. with the samples in place and the operating temperature was maintained during nitriding of the samples for 3 hours, followed by cooling of the furnace at the natural rate. A steady stream of nitrogen (>99% by volume purity) was caused to flow through the furnace throughout the test.

Two starting mixtures were prepared in each case, one containing the stoichiometric proportion of carbon required to reduce the titanium values (as $TiO_2$) in the starting material to titanium, and one containing a 100% excess of carbon.

A sample of 40 g of each of the four starting mixtures was placed in the boats and the samples were simultaneously nitrided as described above, using a nitrogen feed rate of 620 ml/minute.

The matrix reaction products obtained were characterised by X-ray diffraction and quantitative chemical analyses were carried out to determine the quantitative amounts of TiN produced. Titanium contents were determined by fusion followed by atomic absorption spectrophotometry and nitrogen present was determined by chemical analysis.

The chemical compositions of the slag and ilmenite used are summarised in Table 3 hereunder; and the conversion percentages to TiN obtained are summarised in Table 4 hereunder.

Figure 4:
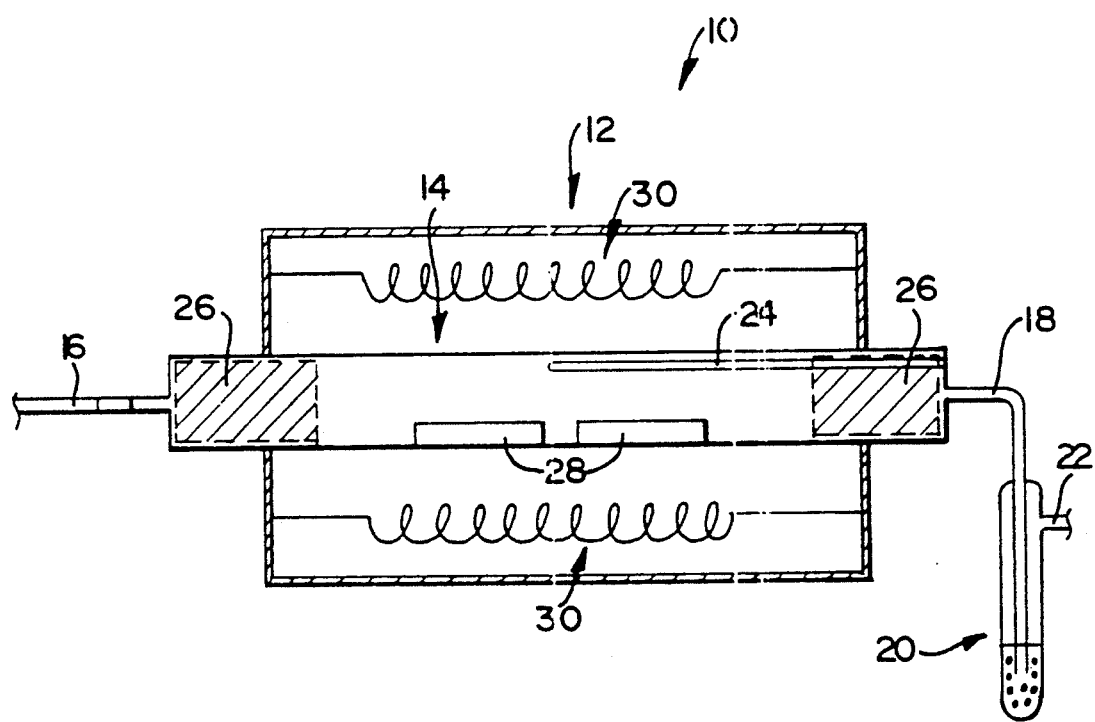
FIG. 4 shows a schematic cross-section of an apparatus used for nitriding in accordance with Example 2.

In FIG. 4 the same reference numerals are used for the same parts as in FIG. 3. The reaction vessel 14 is an aluminosilicate tube and the tubes 16, 18 and 22 and flask 20 are of stainless steel. The graphite boats are shown at 28, and heating elements are shown at 30. Stacks of porous aluminosilicate disc filters are shown at 26, which insulate the inlet and outlet to the reaction vessel 14, the heater 12 as a whole being lagged with insulating material.

TABLE 3

| | Starting Material | |
|---|---|---|
| Constituent | Titaniferous Slag (mass %) | Ilmenite (mass %) |
| $TiO_2$ | 30,5[a] | 48,8 |
| $SiO_2$ | 20,75 | 1,3 |
| MgO | 14,10 | 1,0 |
| CaO | 16,8 | 0,04 |
| $Al_2O_3$ | 13,65 | 0.7 |
| $Cr_2O_3$ | 0,19 | <0,01 |
| FeO | 5,15 | 47,9 |
| $V_2O_3$ | 1,05 | 0,12 |
| MnO | 0,69 | 0,82 |

[a]Major forms: Fassaite $(Ca(Ti,Mg,Al,)(Si,Al)_2O_6)$; Perovskite $(CaTiO_3)$
Minor forms: Pseudobrookite $(Fe_2O_3TiO_2)$; Ulvospinel $(Fe_2TiO_4)$.

TABLE 4

| Starting Material | Carbon Reductant | Reductant Addition (% of stoichiometric proportion) | Conversion to TiN (% by mass) |
|---|---|---|---|
| Slag | Char | 100 | 73,6 |
| Slag | Char | 200 | 92,9 |
| Slag | Coal | 100 | 73,8 |
| Slag | Coal | 200 | 92,7 |
| Ilmenite | Char | 100 | 72,9 |
| Ilmenite | Char | 200 | 94,9 |
| Ilmenite | Coal | 100 | 75,8 |
| Ilmemite | Coal | 200 | 91,6 |

Example 1 confirms that the process of the invention is feasible for use with the titaniferous slag obtained from Highveld Steel and Vanadium Corporation Limited. In particular, FIG. 2 shows that the nitriding at 1550° C. can be employed to nitride an acceptably high proportion of the titanium values present in the slag, with a high degree of selectivity. Table 2 further indicates that a chlorinated product can be obtained of $TiCl_4$ containing only $VCl_4$ and/or $VOCl_3$, $SiCl_4$ and $Cl_2$ as impurities, which can easily be separated from the $TiCl_4$ by distillation, to obtain $TiCl_4$ of a high degree of purity. This $TiCl_4$ can easily be converted to $TiO_2$, if required.

Example 2 shows that nitriding the slag in question, and ilmenite, is feasible at 1300° C., and that the use of a stoichiometric excess of nitrogen of 100% leads to high conversions to TiN of above 90% by mass. It is expected that optimization of temperature, proportion of reductant, reaction time, etc. will lead to even better conversions.

It is a particular advantage of the invention that it provides a process, at least using the slag of the Example, for converting titaniferous slag to a valuable product, namely $TiCl_4/TiO_2$. Such slag, produced as a waste-product in steel and vanadium manufacture by Highveld Steel and Vanadium Corporation Limited, but its volume alone, is at least a potential environmental embarrassment. The process reduces the quantity of waste product which has to be dumped, and any wastes produced by the process of the present invention are ecologically acceptable and potentially useful to certain industries such as the cement industries. Furthermore, ores such as ilmenite, containing relatively low proportions of titanium values, can advantageously be used as starting materials for the process.

We claim:

1. A process for the recovery of titanium values from a complex titanium-containing starting material, the process comprising the steps of:

obtaining a complex matrix containing titanium nitride as a constituent thereof by nitriding titanium values in said complex titanium-containing starting material;

reacting the titanium-nitride in the matrix by chlorinating the titanium nitride in the matrix to obtain a reaction product containing titanium chloride; and separating the titanium chloride from the reaction product.

2. A process as claimed in claim 1, in which the chlorinating of the titanium nitride is by contacting a chlorinating gas with the matrix at a temperature of 200°–500° C., to obtain the titanium chloride as $TiCl_4$.

3. A process as claimed in claim 1, in which the starting material is a complex metallurgical titaniferous slag containing at most 80% by mass titanium values.

4. A process as claimed in claim 1, in which the starting material is selected from the group of ores consisting of rutile, ilmenite, perovskite, armalcolite, fassaite and mixtures thereof.

5. A process as claimed in claim 1, which includes the step, prior to the nitriding of the titanium values, of size reduction of the starting material to a maximum particle size of at most 2000 $\mu$m and an average particle size of at most 600 $\mu$m.

6. A process as claimed in claim 1, in which the nitriding of the titanium values is by contacting a stoichiometric excess of nitrogen gas with the starting material at an elevated temperature and in a reducing environment.

7. A process as claimed in claim 5, in which the contacting of the nitrogen gas with the starting material takes place at a temperature of 1000°–1800° C., in the presence of carbon which provides the reducing environment, sufficient carbon being present to consume any oxygen present in the environment and to provide a stoichiometric excess over that required to reduce the titanium values (as $TiO_2$) in the starting material, to titanium.

8. A process as claimed in claim 7, in which a carbonaceous fuel is burnt in air to provide a combustion gas which is contacted with the starting material to provide said elevated temperature, and to provide the carbon required for the reducing environment in the form of carbon monoxide.

9. A process as claimed in claim 7, which includes the step of admixing a carbonaceous material in finely divided particulate form with the starting material to provide the reducing environment.

10. A process as claimed in claim 9, which includes the step, after the nitriding and before the chlorinating, of separating carbon from the matrix.

11. A process as claimed in claim 1, in which the chlorinating of the titanium nitride is by contacting a chlorinating gas selected from the group consisting of $Cl_2$, HCl, $CCl_4$, $SCl_2$ and mixtures thereof, with the titanium nitride at a temperature of 350°–450° C., to obtain the titanium nitride as $TiCl_4$.

12. A process as claimed in claim 11, in which the chlorinating gas is $Cl_2$, being diluted with nitrogen to form a mixture comprising 20–80% by volume $Cl_2$.

13. A process as claimed in claim 1, in which the matrix which is obtained containing titanium nitride also contains a metal other than titanium in metallic form, the process including the step, before the chlorinating, of separating said other metal from said matrix.

14. A process for the recovery of titanium values from a complex matrix comprising titanium nitride as a constituent thereof, the process comprising the steps of:

reacting the titanium nitride in the matrix by chlorinating the titanium nitride in the matrix to obtain a reaction product containing titanium chloride; and separating the titanium chloride from the reaction product, the chlorinating of the titanium nitride being by contacting a chlorinating gas with the matrix at a temperature of 200°–500° C., to obtain the titanium chloride as $TiCl_4$.

15. A process as claimed in claim 6, in which the chlorinating takes place in an environment which is less reducing than the environment in which the nitriding takes place.

16. A process for the recovery of titanium values from a complex matrix comprising titanium nitride as a constituent thereof, the process comprising the steps of:

reacting the titanium nitride in the matrix by chlorinating the titanium nitride in the matrix to obtain a reaction product containing titanium chloride; and separating the titanium chloride from the reaction product, the process including the step, before the chlorinating, of separating from said matrix any metal other than titanium present in metallic form in the matrix.

17. Titanium values recovered by the process of claim 1.

18. Titanium values recovered by the process of claim 14.

19. Titanium values recovered by the process of claim 16.

20. A method as claimed in claim 14, which includes, prior to the chlorinating of the titanium nitride, a size reduction step whereby the complex matrix is provided with a maximum particle size at most 2000 $\mu$m and an average particle size of at most 600 $\mu$m.

21. A process as claimed in claim 14, in which the chlorinating takes place in an atmosphere which is substantially non-reducing.

22. A process as claimed in claim 14, in which the contacting is with a chlorinating gas selected from the group consisting of $Cl_2$, HCl, $CCl_2$, $SCl_2$ and mixtures thereof, and is at a temperature of 350°–450° C.

23. A process as claimed in claim 22, in which the chlorinating gas is $Cl_2$, being diluted with nitrogen to form a mixture comprising 20–80% by volume $Cl_2$.

24. A process as claimed in claim 14, in which the matrix comprising the titanium nitride contains a metal other than titanium in metallic form, the process including the step, before the chlorinating, of separating said other metal from the matrix.

25. A process as claimed in claim 16, which includes, prior to the chlorinating of the titanium nitride, a size reduction step whereby the complex matrix is provided with a maximum particle size at most 2000 $\mu$m and an average particle size of at most 600 $\mu$m.

26. A process as claimed in claim 16, in which the chlorinating takes place in an atmosphere which is substantially non-reducing.

27. A process as claimed in claim 16, in which the contacting is with a chlorinating gas selected from the group consisting of $Cl_2$, HCl, $CCl_2$, $SCl_2$ and mixtures thereof, and is at a temperature of 350°–450° C.

28. A process as claimed in claim 27, in which the chlorinating gas is $Cl_2$, being diluted with nitrogen to form a mixture comprising 20–80% by volume $Cl_2$.

* * * * *

UNITED STATES PATENT AND TRADEMARK OFFICE
CERTIFICATE OF CORRECTION

PATENT NO. : 5,224,986

DATED : July 6, 1993

INVENTOR(S) : Gerhard J. Mostert, et al

It is certified that error appears in the above-indentified patent and that said Letters Patent is hereby corrected as shown below:

Column 11, line 31, please delete "5" and insert therefor --6--.

Signed and Sealed this

Fifth Day of July, 1994

Attest:

BRUCE LEHMAN

Attesting Officer

Commissioner of Patents and Trademarks